(12) United States Patent
Su et al.

(10) Patent No.: US 8,955,101 B2
(45) Date of Patent: Feb. 10, 2015

(54) UPPER-ORDER COMPUTER, LOWER-ORDER COMPUTER, MONITORING SYSTEM AND MONITORING METHOD

(75) Inventors: Yulin Su, Guangxi (CN); Ben Cai, Guangxi (CN); Rijun Huang, Guangxi (CN)

(73) Assignee: Liuzhou Wuling Motors Co., Ltd.

( * ) Notice: Subject to any disclaimer, the term of this patent is extended or adjusted under 35 U.S.C. 154(b) by 713 days.

(21) Appl. No.: 13/183,987

(22) Filed: Jul. 15, 2011

(65) Prior Publication Data

US 2012/0272312 A1 Oct. 25, 2012

(30) Foreign Application Priority Data

Apr. 22, 2011 (CN) .......................... 2011 1 0102109

(51) Int. Cl.
*G06F 12/00* (2006.01)
(52) U.S. Cl.
USPC ................................... 726/18; 726/6; 726/17
(58) Field of Classification Search
CPC ................. G05B 2219/23304; G05B 19/0426
USPC ...................... 726/18, 6, 17; 713/1
See application file for complete search history.

(56) References Cited

U.S. PATENT DOCUMENTS

2008/0200749 A1* 8/2008 Zheng et al. .................... 600/13

FOREIGN PATENT DOCUMENTS

| CN | 101105694 A | 1/2008 |
|---|---|---|
| CN | 101458535 A | 6/2009 |
| CN | 101750185 A | 6/2010 |

OTHER PUBLICATIONS

Yang et al. "A Novel Medical Infusion Monitoring System Based on ZigBee Wireless Sensor Network", May, 2009, pp. 291-293.*
Notification of the Second Office Action for Chinese Application No. 201110102109.2, issued Jan. 31, 2013, with English translation.
Notification of the First Office Action for Chinese Application No. 201110102109.2, date of notification Mar. 31, 2012, with English translation.

* cited by examiner

*Primary Examiner* — Baotran N To
(74) *Attorney, Agent, or Firm* — Cantor Colburn LLP (57) ABSTRACT

The present disclosure discloses an upper-order computer, a lower-order computer, a monitoring system and a monitoring method, so as to eliminate the disadvantages of low standardization level and small scale in manually setting and adjusting performance parameters. The upper-order computer includes a central control module and an information interacting module, the information interacting module including a human-computer interacting unit, and the central control module including a processing unit, a display control unit and a parameter configuring unit, wherein the processing unit is adapted for controlling a lower-order computer by sending control commands; the display control unit is adapted for processing effective operating data acquired from the lower-order computer, and is adapted for instructing the human-computer interacting unit to perform presenting; and the parameter configuring unit is adapted for configuring parameters of the lower-order computer by sending parameter configuring commands. It can be seen that the upper-order computer is capable of presenting the processed effective operating data and configuring parameters. Compared with directly setting and adjusting the controller by human, the technical solution of the present disclosure has the advantages of high standardization level and large scale.

6 Claims, 9 Drawing Sheets

UPPER-ORDER COMPUTER, LOWER-ORDER COMPUTER, MONITORING SYSTEM AND MONITORING METHOD

CROSS REFERENCE TO RELATED APPLICATION

This application claims the benefit of priority to Chinese Patent Application No. 201110102109.2, entitled "UPPER-ORDER COMPUTER, LOWER-ORDER COMPUTER, MONITORING SYSTEM AND MONITORING METHOD", filed on Apr. 22, 2011 with State Intellectual Property Office of PRC, which is incorporated herein by reference in its entirety.

FIELD OF THE INVENTION

The present disclosure relates to the field of monitoring, and particularly relates to an upper-order computer, a lower-order computer, a monitoring system and a monitoring method.

BACKGROUND OF THE INVENTION

In industry, it is needed to set and adjust performance parameters of controllers and the like. However, manual operation has the disadvantages of low standardization level and small scale.

SUMMARY OF THE INVENTION

Accordingly, it is an object of the present disclosure to provide an upper-order computer, a lower-order computer, a monitoring system and a monitoring method, so as to solve the problems described above.

For the above object, the embodiments of the present disclosure provide the following technical solutions.

According to one aspect of the present disclosure, an upper-order computer is provided, which includes a central control module and an information interacting module, the information interacting module including a human-computer interacting unit; the central control module including a processing unit, a display control unit and a parameter configuring unit, where:

the processing unit is adapted for controlling a lower-order computer by sending control commands;

the display control unit is adapted for processing effective operating data acquired from the lower-order computer, and for instructing the human-computer interacting unit to perform presenting, the effective operating data including at least one of current operating parameter information of a controller of the lower-order computer and peripheral operating information; and the parameter configuring unit is adapted for configuring parameters of the lower-order computer by sending parameter configuring commands.

According to another aspect of the present disclosure, a lower-order computer is provided, which includes a control module and a peripheral detecting and sampling module, the control module including a controller, an execution unit and a fault detecting and handling unit which uploads operating data, where:

the execution unit is adapted for executing control commands and parameter configuring commands sent by an upper-order computer; and the operating data includes at least one of current operating parameter information of the controller and peripheral operating information, wherein the operating information is generated from the calculation performed by the fault detecting and handling unit on sampled peripheral data collected by the peripheral detecting and sampling module.

According to yet another aspect of the present disclosure, a monitoring system is provided, which includes an upper-order computer and a lower-order computer, where:

the upper-order computer is adapted for controlling the lower-order computer by sending control commands, for configuring parameters of the lower-order computer by sending parameter configuring commands, and for processing and presenting effective operating data acquired from the lower-order computer, the effective operating data including at least one of current operating parameter information of a controller in the lower-order computer and peripheral operating information; and the lower-order computer is adapted for executing the control commands and the parameter configuring commands sent by the upper-order computer, and for uploading operating data to the upper-order computer, the operating data including at least one of the current operating parameter information of the controller and the peripheral operating information, the operating information being generated from the calculation performed by the lower-order computer on sampled peripheral data collected by a peripheral detecting and sampling module in the lower-order computer.

According to yet another aspect of the present disclosure, a monitoring method based on an upper-order computer and a lower-order computer interconnected with each other is provided, the method including:

controlling, by the upper-order computer, the lower-order computer by sending control commands;

processing, by the upper-order computer, effective operating data acquired from the lower-order computer, and instructing, by the upper-order computer, a human-computer interacting unit to perform presenting, the effective operating data including at least one of current operating parameter information of a controller in the lower-order computer and peripheral operating information; and configuring, by the upper-order computer, parameters of the lower-order computer by sending parameter configuring commands.

From the technical solutions described above, it can be seen that the lower-order computer includes the controller, and the upper-order computer is capable of presenting the processed effective operating data and configuring the parameters for the lower-order computer. Compared with directly setting and adjusting the controller by human, the technical solution of the present disclosure has the advantages of high standardization level and large scale.

BRIEF DESCRIPTION OF THE DRAWINGS

Technical solutions of the embodiments of the present invention or the prior art will be illustrated more clearly with the following brief description of the drawings. Apparently, the drawings referred in the following description constitute only some embodiments of the invention. Those skilled in the art may obtain some other drawings from these drawings without any inventive labor.

DETAILED DESCRIPTION OF THE INVENTION

For the purpose of reference and clarity, the technical terms, acronyms or abbreviations used herein are summarized as follows:

Handshake signals: a series of signals identifiable to each other, which occur in communication or information transfer between two computers or other devices. Hardware handshake refers to a signal exchange via a dedicated line rather than a data line, through which devices involved in the handshake indicate that the devices are ready for data sending or receiving. Software handshake refers to signals transmitted via the same line and used for transferring data, the example of which may be the communication via a telephone line by using a modem.

The technical solutions of the embodiments of the present disclosure will be described clearly and completely in conjunction with the drawings. Apparently, the described embodiments are only some rather than all embodiments of the present disclosure. Any other embodiments obtained from the embodiments of the present disclosure by those skilled in the art without any inventive labor fall within the scope of the invention.

In industry, it is needed to set and adjust performance parameters of controllers and the like. However, manual operation has the disadvantages of low standardization level and small scale.

Accordingly, it is an object of the present disclosure to provide an upper-order computer, so as to solve the problems described above.

Figure 1:
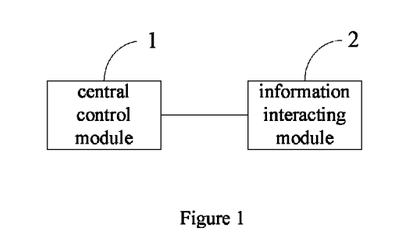
FIG. 1 is a schematic view of the structure of an upper-order computer according to an embodiment of the present disclosure.
Figure 2:
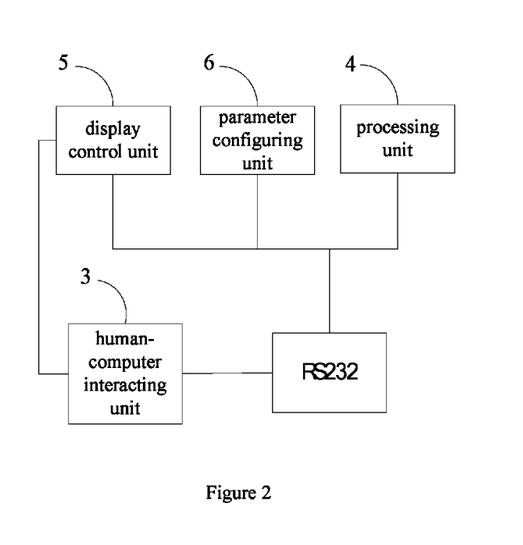
FIG. 2 is a schematic view of the specific structure of the upper-order computer in FIG. 1.

FIGS. 1-2 show an exemplary structure of the upper-order computer. The upper-order computer includes a central control module 1 and an information interacting module 2. The information interacting module 2 includes a human-computer interacting unit 3. The central control module 1 includes a processing unit 4, a display control unit 5 and a parameter configuring unit 6.

The processing unit 4 is used for controlling a lower-order computer by sending control commands;

The display control unit 5 is used for processing effective operating data acquired from the lower-order computer, and is used for instructing the human-computer interacting unit 3 to perform presenting. That is to say, the display control unit 5 may control the displaying of the effective operating data.

The parameter configuring unit 6 is used for configuring parameters of the lower-order computer by sending parameter configuring commands.

The upper-order computer may be in communication with outside (such as a lower-order computer) via a RS232 interface, and the RS232 interface may belong to the information interacting module 2.

Accordingly, an embodiment of the present disclosure further provides a lower-order computer. The lower-order computer may be in cooperation with the upper-order computer to compose a monitoring system, which also falls in the scope of the present invention.

Figure 3:
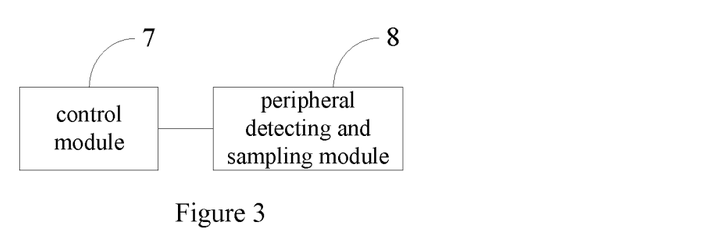
FIG. 3 is a schematic view of the structure of a lower-order computer according to an embodiment of the present disclosure.
Figure 4:
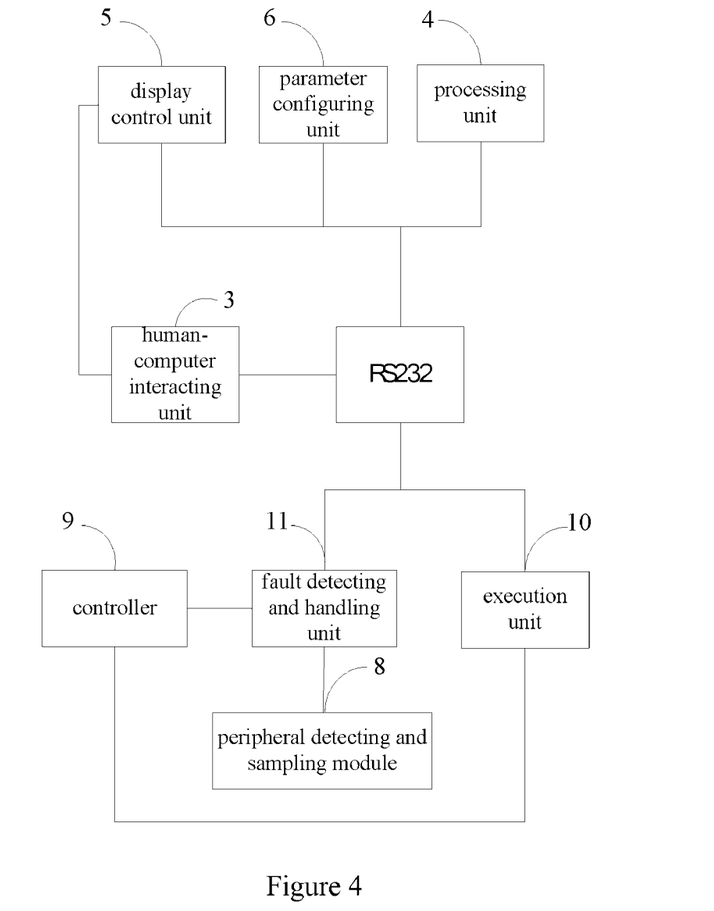
FIG. 4 is a schematic view of the specific structure of the lower-order in FIG. 3.

Referring to FIGS. 3-4, the lower-order computer may include a control module 7 and a peripheral detecting and sampling module 8. The control module 7 includes a controller 9, an execution unit 10, and a fault detecting and handling unit 11 which uploads operating data.

The execution unit 10 is used for executing control commands (from the processing unit 4) and parameter configuring commands (from the parameter configuring unit 6) sent by the upper-order computer.

The operating data includes at least one of current operating parameter information of the controller 9 and peripheral operating information. The operating information is generated from the calculation performed by the fault detecting and handling unit 11 on sampled peripheral data collected by the peripheral detecting and sampling module 8.

Of course, in other embodiments of the present disclosure, the controller 9 may be provided in itself with the function of the execution unit 10, the function of the fault detecting and handling unit 11, or both of the functions. The skilled in the art may design as needed, and it will not be described in details herein.

Accordingly, with the upper-order computer and the lower-order computer interconnected with each other, an embodiment of the present disclosure further provides a monitoring method. The method includes at least the following the steps.

S1: controlling, by the upper-order computer, the lower-order computer by sending control commands;

S2: processing and presenting, by the upper-order computer, the effective operating data command acquired from the lower-order computer, the operating data including at least one of current operating parameter information of the controller of the lower-order computer and peripheral operating information;

S3: configuring, by the upper-order computer, parameters of the lower-order computer by sending parameter configuring commands.

The lower-order computer may also be in communication with outside (such as the upper-order computer) via a RS232 interface.

The information interaction between the upper-order computer and the lower-order computer may be automatic or may starts in accordance with a user input. For example, a user may input a control instruction; the processing unit 4 converts the control instruction into a control command that is identifiable to related components of the lower-order computer, and then sends the control command to the lower-order computer; after receiving the control command, the execution unit 10 of the lower-order computer verifies whether the control command is correct, and executes the command on positive determination.

Similarly, the upper-order computer may also start the parameter configuration for the lower-order computer automatically or in accordance with user input in a similar way.

Similarly, the upper-order computer may automatically send requests to the lower-order computer periodically or randomly to request the lower-order computer to upload the operating parameters, or the upper-order computer may send requests according to user input. The lower-order computer may automatically upload the operating parameters to the upper-order computer periodically or randomly. The presenting of the operating parameters by the upper-order computer may be implemented by the interactive steps below.

The upper-order computer sends a request to the controller or the control module of the lower-order computer in accordance with a protocol, and the controller or the control module uploads operating parameter(s) after receiving the request; the upper-order computer verifies the operating parameter(s) uploaded by the controller or the control module, and if the verification is passed (an operating parameter passing the verification is an effective operating parameter), the operating parameter(s) will be displayed with the human-computer interacting interface.

In different embodiments, processing on the effective operating data by the upper-order computer and calculation on the sampled peripheral data by the lower-order computer will be different. The following are several examples.

For example, the processing on the effective operating data by the upper-order computer may be as follows: comparing the effective operating data with normal operating data (which may be stored at a predetermined location in advance) to analyze whether any fault or anomaly occurs; if any fault or anomaly occurs, generating and providing alert information together with the operating data to the human-computer interacting interface for presenting, and if no fault occurs, directly instructing the human-computer interacting interface to present the operating data.

For example, the processing on the effective operating data by the upper-order computer may be as follows: comparing the effective operating data with the normal operating data; if any fault or anomaly occurs, except for instructing the human-computer interacting interface to presenting the operating data, generating and providing the reason for the fault or the anomaly, for reference by the user.

For example, the calculation on the sampled peripheral data by the lower-order computer may be as follows: comparing the sampled peripheral data with normal sampled peripheral data; if any fault or anomaly occurs, directly generating and uploading fault information (which belongs to the peripheral operating information) together with the sampled peripheral data.

For example, the calculation on the sampled peripheral data by the lower-order computer may be as follows: performing digital filtering, magnification and the like on the sampled peripheral data.

It can be seen that the upper-order computer may present the processed effective operating data and configure parameters of the lower-order computer. The technical solutions provided by the embodiments of the present disclosure have the advantages of high standardization level and large scale, and facilitate maintenance of products while simplifying the production process and improving production efficiency and quality. Moreover, by appropriate configuration, the upper-order computer may acquire the operating status information of the lower-order computer and information about currently occurred fault in real time, which facilitates analysis and judgment of the fault.

Figure 5:
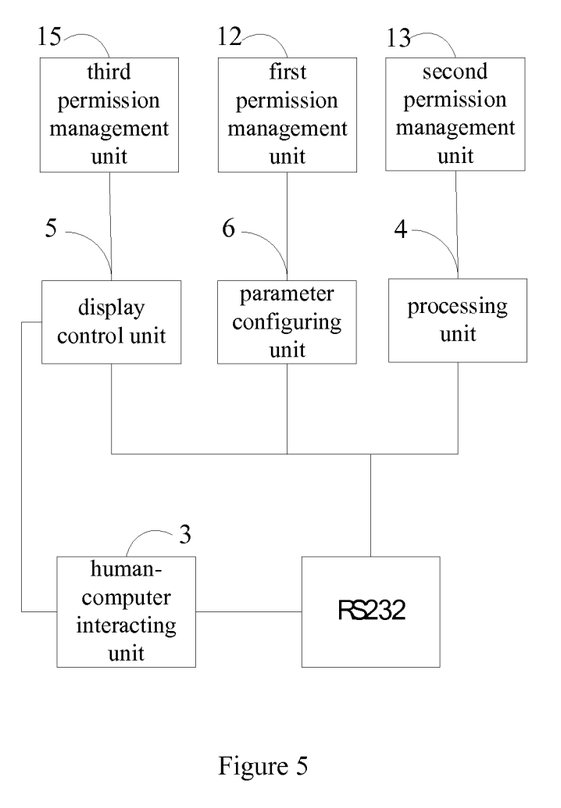
FIG. 5 is a schematic view of the structure of another upper-order computer according to an embodiment of the present disclosure.

Considering the security, referring to FIG. 5, in other embodiments of the present disclosure, the central control module 1 of the upper-order computer in all the above embodiments may further includes a first permission management unit 12 for managing the permission of the parameter configuring unit 6 for parameter configuration, or a second permission management unit 13 for managing the permission of the processing unit 4 for controlling, or even a third permission management unit 14 for managing the permission of the display control unit 5 for display controlling. The first, the second and the third permission management units may coexist, may exist alone or any two of them may exist, and those skilled in the art may design as needed. Alternatively, it is feasible to provide one permission management unit to carry out unified management on the permissions for parameter configuration, controlling and display controlling.

Thus, the higher the permission is, the more operations can be done. For example, with a low permission, only view of the effective operating data of the lower-order computer is allowed (i.e. having permission for display controlling to a certain extent), but parameter configuration is not allowed, or only configuration of non-core parameters is allowed.

Moreover, the permissions may be set for example when the upper-order computer is manufactured and may not be altered. Of course, it is more common to set the permissions by clients themselves.

The level of the permission may be implemented through a password. For example, a user has a certain level of permission without inputting any password, and when inputting a correct password has a level of permission corresponding to the password. The password may be a fixed password or a dynamic password. Hereafter, the following embodiments will be described mainly with respect to a dynamic password.

Figure 6:
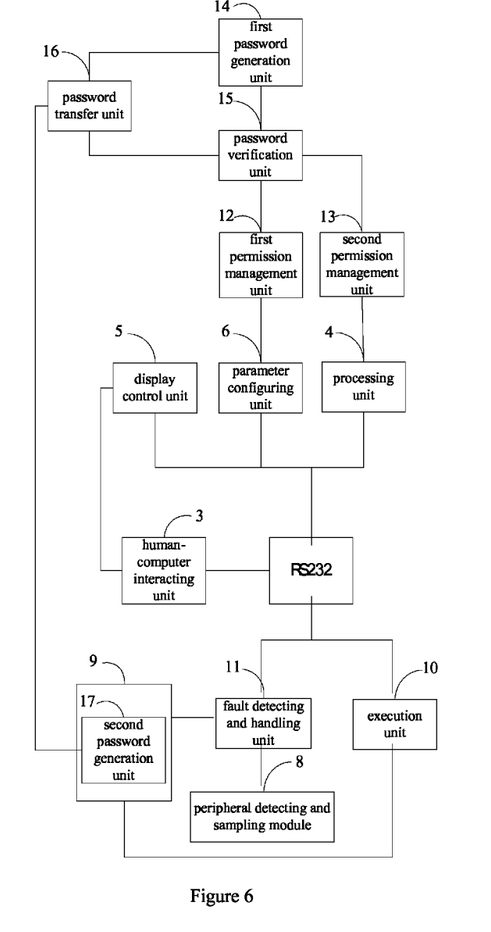
FIG. 6 is a schematic view of the structure of yet another upper-order computer according to an embodiment of the present disclosure.

In the present embodiment, referring to FIG. 6, the upper-order computer includes a first password generation unit 14, a password verification unit 15 and a password transfer unit 16, and the controller 9 of the lower-order computer further includes a second password generation unit 17.

The first password generation unit 14 is used for generating a current password according to a preset algorithm with an acquired password uploaded by the lower-order computer. The password uploaded by the lower-order computer is randomly generated by the second password generation unit 17 with stored password data.

The password verification unit 15 is used for comparing and determining whether a password input by the user matches with the current password generated by the first password generation unit 14, and getting a matching result.

The first permission management unit 12 manages the permission of the parameter configuring unit 6 for parameter configuration, according to the matching result. For example, if it is not matched, the level of permission degrades; if it is matched, the parameter configuring unit 6 is given a permission corresponding to the current password.

The second permission management unit 13 manages the permission of the processing unit 4 for controlling, according to the matching result. For example, if it is not matched, the level of permission degrades; if it is matched, the processing unit 4 is given a permission corresponding to the current password.

The password transfer unit 16 is used for transferring the current password, which is generated by the first password generation unit, to the lower-order computer, so that the lower-order computer may store the current password as the password data.

The password transfer unit 16 may transfer the current password to the second password generation unit 17 immediately after the generation of the current password by the first password generation unit 14, or transfer the current password to the second password generation unit 17 after the password verification unit 15 has obtained the matching result.

Figure 7A:
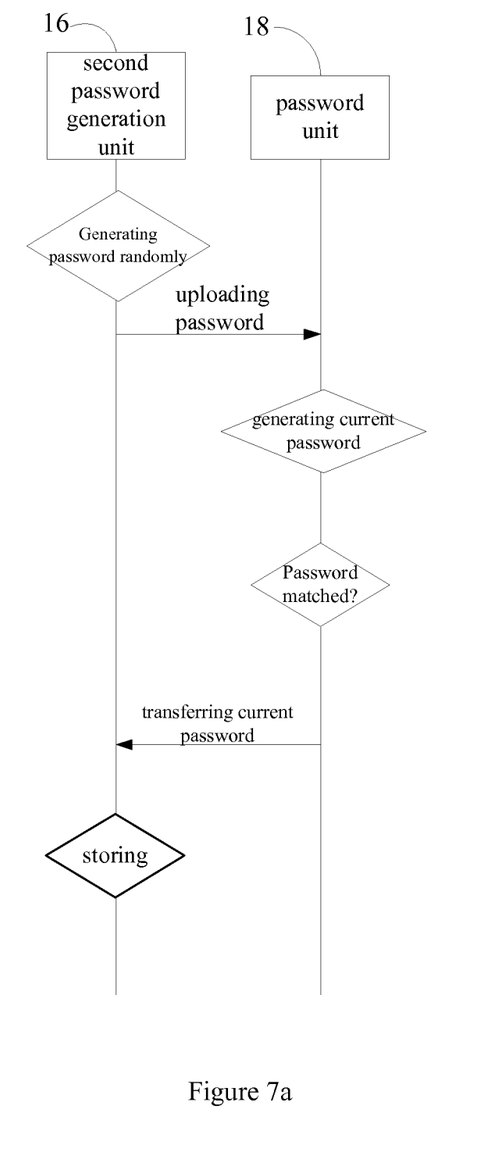
FIG. 7a is a flowchart of generation and verification of a password.

Of course, in practice, the function of the password transfer unit 16 may be implemented by the first password generation unit 14 or the password verification unit 15; or the combination of the first password generation unit 14, the password verification unit 15 and the password transfer unit 16 may be implemented by a password unit 18. FIG. 7a is a flowchart illustrating that the password unit 18, which is used to implement the functions of the three units described above, cooperates with the lower-order computer including the second password generation unit 17, in order to generate and verify the current password.

Moreover, when there are a plurality of permission levels (for example, level 1 to level 3) in the upper-order computer, the second password generation unit 17 may randomly generate a plurality of (for example, three) passwords at a time with the stored password data, and send the plurality of passwords to the upper-order computer together. The upper-order computer may generate three different current passwords (denoted by a, b and c) with the three passwords from the second password generation unit 17, so as to correspond different permission levels (assuming that password a corresponds to level 1, password b corresponds to level 2, and password c corresponds to level 3). When a user inputs the password a, his/her permission level is level 1; when a user inputs the password b, his/her permission level is level 2; and so on. Alternatively, the second password generation unit 17 may randomly generate only one password at a time and send the password to the upper-order computer, and the upper-order computer may generate three different current passwords with that one password.

Accordingly, the monitoring method provided in the embodiment of the present disclosure may further include the following steps:

randomly generating a password with stored password data, and uploading the password to the upper-order computer, by the lower-order computer;

generating, by the upper-order computer, a current password according to a preset algorithm by utilizing the password uploaded by the lower-order computer;

after a user inputs a password, comparing and determining whether the password input by the user matches with the current password, so as to get a matching result, and managing permission for parameter configuration and/or controlling according to the matching result, by the upper-order computer;

sending the current password to the lower-order computer, so that the lower-order computer stores the current password as password data.

Figure 7B:
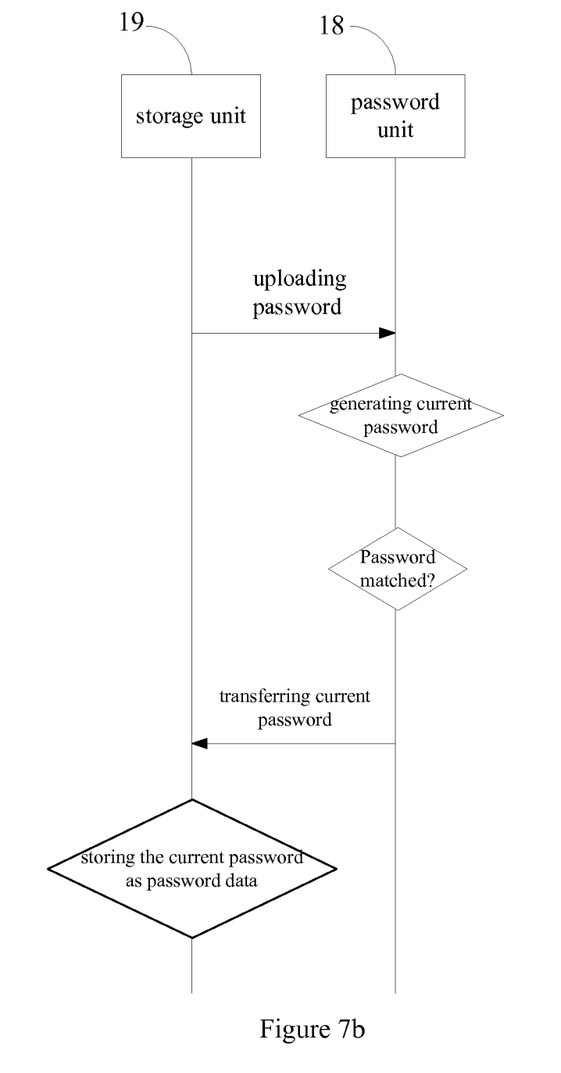
FIG. 7b is another flowchart of generation and verification of a password.

Of course, in other embodiments of the present disclosure, the first password generation unit 14 may also generate the current password according to a preset algorithm by directly utilizing password data which has already been stored in the lower-order computer (the lower-order computer may have pre-stored original password data when leaving the factory). In this case, since there is no need for the lower-order computer to randomly generate a password with stored password data, the second password generation unit 17 may be omitted from the lower-order computer.

FIG. 7b is a flowchart illustrating that the password unit 18, which is used to implement the functions of the three units described above, cooperates with the lower-order computer without the second password generation unit 17, in order to generate and verify the current password. (In FIG. 7b, the lower-order computer includes a storage unit 19 for storing the password data).

Accordingly, the monitoring method provided in the embodiment of the present disclosure may further include the following steps:

uploading, by the lower-order computer, the stored password data to the upper-order computer;

generating, by the upper-order computer, a current password according to a preset algorithm by utilizing the password data uploaded by the lower-order computer;

after a user inputs a password, comparing and determining whether the password input by the user matches with the current password, so as to get a matching result, and managing permission for parameter configuration and/or controlling according to the matching result, by the upper-order computer;

sending the current password to the lower-order computer, so that the lower-order computer stores the current password as password data.

Figure 8:
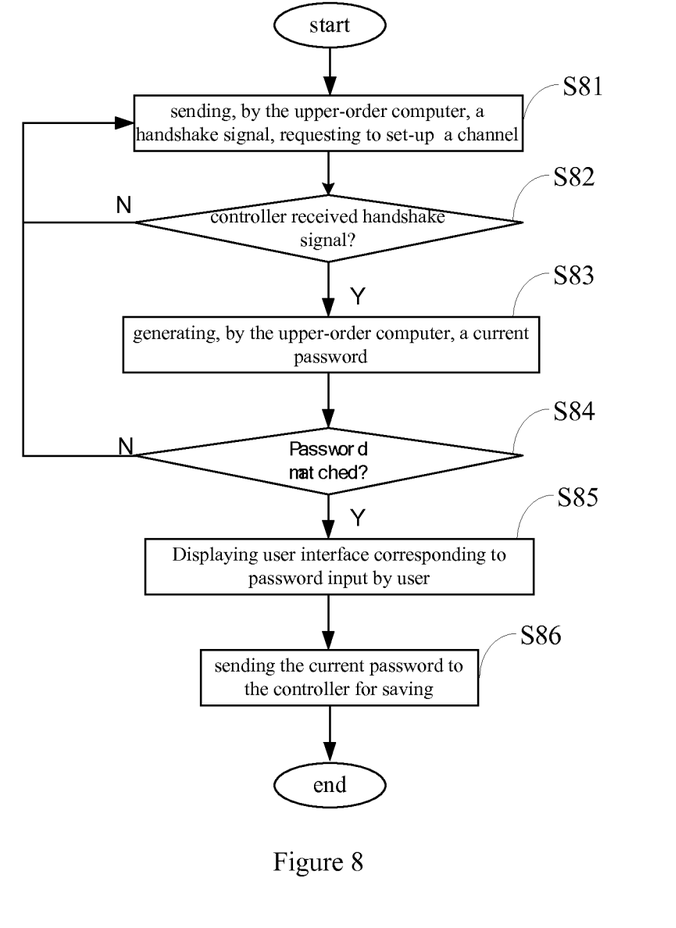
FIG. 8 is yet another flowchart of generation and verification of a password.

It should be noted that the generation and matching of the current password by the upper-order computer may be performed during the logging in of the user. Referring to FIG. 8, the specific process may be as follows.

S81: sending a handshake signal by the upper-order computer, requesting to set-up a channel;

S82: determining, by the controller of the lower-order computer, whether the handshake signal is received; if received, proceeding to step S83, if not received, returning to step S81;

S83: generating, by the upper-order computer, a current password by using the password uploaded by the lower-order computer;

S84: determining, by the upper-order computer, whether a password input by a user matches with the current password; if matches, proceeding to step S85, if not match, returning to step S81;

S85: displaying, by the upper-order computer, a user interface corresponding to the password input by the user;

S86: sending, by the upper-order computer, the current password to the controller for saving.

The upper-order computer, the lower-order computer, the monitoring system and the monitoring method described above may be widely applied in the industrial fields. In the following, the technical solution of the present disclosure will be described with reference to a particular application of monitoring a separately excited direct current motor in an electric vehicle.

Figure 9:
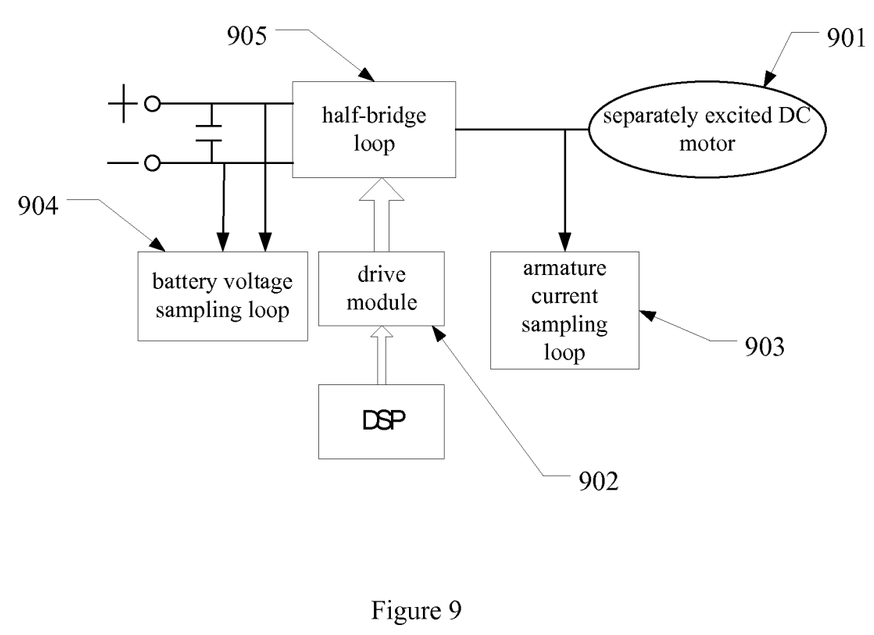
FIG. 9 is a schematic view of the structure of another lower-order computer according to an embodiment of the present disclosure.

In the present embodiment, referring to FIG. 9, the lower-order computer includes a separately excited direct current motor 901, a digital signal processor control module (DSP), a power module (not shown in FIG. 9), a drive module 902, a peripheral detecting and sampling module and a half-bridge loop 905.

The power module includes an armature current detecting and protecting loop, an excitation current detecting loop and a battery voltage detecting and protecting loop. Besides detecting currents, the armature current detecting and protecting loop and the excitation current detecting loop may implement over-current protection. Besides detecting voltages, the battery voltage detecting and protecting loop may implement overvoltage protection.

A trigger signal for the power module is generated by the DSP, passes to the drive module 902 to drive the separately excited direct current motor 90.

The peripheral detecting and sampling module includes an armature current sampling loop 903, an excitation current sampling loop, a battery voltage sampling loop 904, a button and throttle signal detecting loop, a temperature detecting loop, a motor speed detecting loop and others.

The DSP has similar function as the control module 7 in the embodiments described above, and includes a digital signal processor, a programmable logic device, a memory and a communication interface for communicating with the upper-order computer. The digital signal processor may be divided into an EEPROM control sub-module for reading or storing performance parameters of the electric vehicle, a fault detecting and handling sub-module (having similar function as the fault detecting and handling unit 11) for detecting and determining the fault of the electric vehicle in real time, and a status detecting sub-module for timely detecting the status of the electric vehicle.

In the present embodiment, the peripheral operating information includes at least one of armature current, excitation current, battery voltage, button and throttle signal parameter, temperature and motor speed.

The embodiments of the invention are described in a progressive way, each of which emphasizes the differences from others, and the same or similar elements among the embodiments can be referred to each other. Since the system disclosed in the embodiments corresponds to the method therein, the description thereof is relatively simple, and for relevant matters references may be made to the description of the method.

The skilled in the art can understand that all or part of the flows of the exemplary methods can be implemented with related hardware by following instructions of computer programs, in which the programs can be stored in a computer readable storage medium. When executed, the programs can implement the flows of the various methods. The storage medium can be a magnetic disk, an optical disk, a Read-Only Memory (ROM), or a Random Access Memory (RAM), etc.

With the above descriptions of the disclosed embodiments, the skilled in the art may practice or use the present invention. Various modifications to the embodiments are apparent for the skilled in the art. The general principle suggested herein can be implemented in other embodiments without departing from the spirit or scope of the invention. Therefore, the present invention should not be limited by the embodiments disclosed herein, but has the widest scope that is conformity with the principle and the novel features disclosed herein.

What is claimed is:

1. An upper-order computer comprising a central control module, an information interacting module, a first password generation unit, a password verification unit and a password transfer unit, the information interacting module comprising a human-computer interacting unit, and the central control module comprising a processing unit, a display control unit, a parameter configuring unit, a first permission management unit for managing a first permission of the parameter configuring unit for parameter configuration, and a second permission management unit for managing a second permission of the processing unit for controlling, wherein:

the processing unit is configured for controlling a lower-order computer by sending control commands;

the display control unit is configured for processing effective operating data acquired from the lower-order computer, and is configured for instructing the human-computer interacting unit to perform presenting, the effective operating data including at least one of current operating parameter information of a controller in the lower-order computer and peripheral operating information; and the parameter configuring unit is configured for configuring parameters of the lower-order computer by sending parameter configuring commands;

the first password generation unit is configured for generating a current password according to a preset algorithm by utilizing an acquired password uploaded by the lower-order computer, wherein the acquired password uploaded by the lower-order computer is randomly generated by the lower-order computer from stored password data;

the password verification unit is configured for comparing and determining whether a password input by a user matches with the current password generated by the first password generation unit, so as to get a matching result;

the first permission management unit manages the first permission of the parameter configuring unit for parameter configuration according to the matching result;

the second permission management unit manages the second permission of the processing unit for controlling according to the matching result; and the password transfer unit is configured for transferring the current password generated by the first password generation unit, to the lower-order computer, so that the lower-order computer stores the current password as the password data.

2. The upper-order computer according to claim 1, wherein the peripheral operating information includes at least one of armature current, excitation current, battery voltage, button and throttle signal parameter, temperature and motor speed.

3. A lower-order computer comprising a control module, a peripheral detecting and sampling module, and a second password generation unit, the control module comprising a controller, an execution unit, and a fault detecting and handling unit which uploads operating data, wherein:

the execution unit is configured for executing control commands and parameter configuring commands sent by an upper-order computer;

the operating data includes at least one of current operating parameter information of the controller and peripheral operating information, wherein the operating information is generated from a calculation performed by the fault detecting and handling unit on sampled peripheral data collected by the peripheral detecting and sampling module; and the second password generation unit is configured for randomly generating an acquired password from stored password data and for uploading the acquired password, wherein an upper-order computer generates a current password according to a preset algorithm by utilizing the acquired password uploaded by the lower-order computer, compares and determines whether a password input by a user matches with the current password, so as to get a matching result, manages a first permission for parameter configuration according to the matching result, manages a second permission for controlling according to the matching result, and transfers the current password to the lower-order computer, so that the lower-order computer stores the current password as the password data.

4. The lower-order computer according to claim 3, further comprising a power module, wherein:

the power module of the lower-order computer comprises an armature current detecting and protecting loop, an excitation current detecting loop and a battery voltage detecting and protecting loop;

the peripheral detecting and sampling module comprises an armature current sampling loop, an excitation current sampling loop, a battery voltage sampling loop, a button and throttle signal detecting loop, a temperature detecting loop and a motor speed detecting loop;

the peripheral operating information includes at least one of armature current, excitation current, battery voltage, button and throttle signal parameter, temperature and motor speed.

5. A monitoring system comprising an upper-order computer and a lower-order computer, wherein:
the upper-order computer is configured for controlling the lower-order computer by sending control commands, for configuring parameters of the lower-order computer by sending parameter configuring commands, and for processing and presenting effective operating data acquired from the lower-order computer, the effective operating data including at least one of current operating parameter information of a controller in the lower-order computer and peripheral operating information, for generating a current password according to a preset algorithm by utilizing an acquired password uploaded by the lower-order computer, comparing and determining whether a password input by a user matches with the current password, so as to get a matching result, managing a first permission for parameter configuration according to the matching result, managing a second permission for controlling according to the matching result, and transferring the current password to the lower-order computer; and
the lower-order computer is configured for executing the control commands and the parameter configuring commands sent by the upper-order computer, and for uploading operating data to the upper-order computer, the operating data including at least one of the current operating parameter information of the controller and the peripheral operating information, the peripheral operating information being generated from a calculation performed by the lower-order computer on sampled peripheral data collected by a peripheral detecting and sampling module in the lower-order computer, for randomly generating the acquired password from stored password data and for uploading the acquired password to the upper-order computer, and for storing the current password received from the upper-order computer as the password data.

6. A monitoring method based on an upper-order computer and a lower-order computer interconnected with each other, the method comprising:
controlling, by the upper-order computer, the lower-order computer by sending control commands;
processing, by the upper-order computer, effective operating data acquired from the lower-order computer, and instructing, by the upper-order computer, a human-computer interacting unit to perform presenting, the effective operating data including at least one of current operating parameter information of a controller in the lower-order computer and peripheral operating information;
configuring, by the upper-order computer, parameters of the lower-order computer by sending parameter configuring commands;
randomly generating an acquired password with stored password data, and uploading the acquired password to the upper-order computer, by the lower-order computer;
generating, by the upper-order computer, a current password according to a preset algorithm by utilizing the acquired password uploaded by the lower-order computer;
after a user inputs a password, comparing and determining whether the password input by the user matches with the current password, so as to get a matching result, and managing permission for parameter configuration and/or controlling according to the matching result, by the upper-order computer; and
sending the current password to the lower-order computer, so that the lower-order computer stores the current password as the password data.

\* \* \* \* \*